(12) United States Patent
Salter et al.

(10) Patent No.: US 10,202,069 B2
(45) Date of Patent: Feb. 12, 2019

(54) ILLUMINATED VEHICLE CONTAINER ASSEMBLY AND CONTAINER ILLUMINATION METHOD

(71) Applicant: Ford Global Technologies, LLC, Dearborn, MI (US)

(72) Inventors: Stuart C. Salter, White Lake, MI (US); James J. Surman, Clinton Township, MI (US); David Brian Glickman, Southfield, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/645,139

(22) Filed: Jul. 10, 2017

(65) Prior Publication Data

US 2019/0009710 A1    Jan. 10, 2019

(51) Int. Cl.
*B60Q 1/26* (2006.01)
*B60Q 3/225* (2017.01)
(Continued)

(52) U.S. Cl.
CPC .......... *B60Q 1/2661* (2013.01); *B60Q 3/225* (2017.02); *B60Q 3/64* (2017.02); *B60R 7/04* (2013.01); *B60Q 1/00* (2013.01); *B60Q 3/00* (2013.01)

(58) Field of Classification Search
CPC . B60Q 3/225; A45C 2200/10; A45C 2200/20; A45C 15/06; F21D 2331/80; F21D 2331/801; F21D 2331/8011; F21D 2331/8012; F21D 2331/8013; F21D 2331/8014; F21D 2331/8015; F21D 2331/802; F21D 2331/803; F21D 2331/804; F21D 2331/8041; F21D 2331/805; F21D 2331/806; F21D 2331/807; F21D 2331/808; F21D 2331/809; F21D 2331/81; F21D 2331/811; F21D 2331/812
See application file for complete search history.

(56) References Cited

U.S. PATENT DOCUMENTS 6,182,462 B1 *  2/2001  Bania ................ A45C 11/20
                                                          62/264
6,260,360 B1 *  7/2001  Wheeler ............... A01N 1/02
                                                           62/3.6
(Continued)

FOREIGN PATENT DOCUMENTS

KR        101421929         7/2014

OTHER PUBLICATIONS

Westbrook, Justin T., Comment of the Day: Party in the Trunk, Beer in the Frunk Edition, Aug. 1, 2016, retrieved from http://jalopnik.com/comment-of-the-day-party-in-the-trunk-beer-in-the-fru-1784675103.

(Continued)

*Primary Examiner* — Robert J May
(74) *Attorney, Agent, or Firm* — Carlson, Gaskey & Olds, P.C.

(57) ABSTRACT

An exemplary vehicle container assembly includes an outer bin, an inner bin received within the outer bin, and a lighting assembly that illuminates an interior of the inner bin through a translucent area of the inner bin. An exemplary vehicle container illumination method includes illuminating an interior area of an inner bin through a translucent area of the inner bin.

17 Claims, 4 Drawing Sheets

(51) Int. Cl.
  *B60Q 3/64*  (2017.01)
  *B60R 7/04*  (2006.01)
  *B60Q 1/00*  (2006.01)
  *B60Q 3/00*  (2017.01)

(56) References Cited

U.S. PATENT DOCUMENTS

| | | | |
|---|---|---|---|
| 7,043,926 B2* | 5/2006 | Smith | B60H 1/00014 |
| | | | 62/199 |
| 7,762,601 B2 | 7/2010 | Shea et al. | |
| 8,979,297 B2* | 3/2015 | Statham | F25D 27/00 |
| | | | 362/154 |
| 9,242,598 B2 | 1/2016 | Mayer et al. | |
| 9,671,158 B1* | 6/2017 | Sandberg | F25D 27/005 |
| 10,018,350 B2* | 7/2018 | Brown | F21V 33/008 |
| 2009/0218849 A1 | 9/2009 | Rupar | |
| 2014/0043837 A1 | 2/2014 | Michaud | |
| 2016/0023585 A1 | 1/2016 | Salter et al. | |
| 2018/0014617 A1* | 1/2018 | Finch | A45C 15/06 |

OTHER PUBLICATIONS

Dnews, Ram Pickup Named Top Tailgater to Kick Off Football Season, Sep. 5, 2011, retrieved from https://www.seeker.com/ram-pickup-named-top-tailgater-to-kick-off-football-season-1765402800.html.

\* cited by examiner

ILLUMINATED VEHICLE CONTAINER ASSEMBLY AND CONTAINER ILLUMINATION METHOD

TECHNICAL FIELD

This disclosure relates generally to a vehicle container and, more particularly, to illuminating a vehicle container that holds items, such as beverages, ice, or both.

BACKGROUND

Vehicles include various compartments that are accessible from outside the vehicle, such as an engine compartment or trunk compartment, for example. In electrified vehicles, an additional area normally occupied by an internal combustion engine may be available for added cargo space under a hood or other closure panel.

SUMMARY

A vehicle container assembly according to an exemplary aspect of the present disclosure includes, among other things, an outer bin, an inner bin received within the outer bin, and a lighting assembly that illuminates an interior of the inner bin through a translucent area of the inner bin.

In a further non-limiting embodiment of the foregoing assembly, an entirety of the inner bin is translucent.

A further non-limiting embodiment of any of the foregoing assemblies includes the lighting assembly as a light emitting diode (LED).

A further non-limiting embodiment of any of the foregoing assemblies includes the LED as a multi-colored LED.

In a further non-limiting embodiment of any of the foregoing assemblies, the lighting assembly is configured to selectively illuminate the interior in a plurality of different colors.

A further non-limiting embodiment of any of the foregoing assemblies includes a temperature sensor. A first one of the colors in the plurality of different colors corresponds to a first temperature measured by the temperature sensor. A different, second one of the colors in the plurality of different colors corresponds to a different, second temperature measurement measured by the temperature sensor.

A further non-limiting embodiment of any of the foregoing assemblies includes a lid that covers the interior area.

A further non-limiting embodiment of any of the foregoing assemblies includes a heater that selectively heats the interior of the inner bin.

A further non-limiting embodiment of any of the foregoing assemblies includes the lighting assembly disposed within the outer bin, and further includes a translucent lens of the outer bin. The lighting assembly illuminates the interior area with light that moves from the lighting assembly and passes through both the translucent lens and the inner bin.

A vehicle according to an exemplary aspect of the present disclosure includes the vehicle container assembly in a compartment of the vehicle.

A further non-limiting embodiment of the foregoing vehicle includes the vehicle as an electrified vehicle.

A vehicle container illumination method according to another exemplary aspect of the present disclosure includes, among other things, illuminating an interior area of an inner bin through a translucent area of the inner bin.

A further non-limiting embodiment of the foregoing method includes the inner bin received within an outer bin during the illuminating.

In a further non-limiting embodiment of any of the foregoing methods, the inner bin is removable from the outer bin.

A further non-limiting embodiment of any of the foregoing methods includes illuminating the interior area with a first color in response to a first temperature and illuminating the interior area with a different, second color in response to a different, second temperature.

In a further non-limiting embodiment of any of the foregoing methods, light emanates from a lighting assembly within the outer bin during the illuminating.

In a further non-limiting embodiment of any of the foregoing methods, light from the lighting assembly passes through a translucent lens of the outer bin and additionally passes though the translucent area of the inner bin during the illuminating.

In a further non-limiting embodiment of any of the foregoing methods, an entirety of the inner bin is translucent.

A further non-limiting embodiment of any of the foregoing methods includes heating the interior area with a heat source adjacent an exterior of the inner bin.

A further non-limiting embodiment of any of the foregoing methods includes adjusting a lighting pattern of the illuminating by changing a lighting intensity, a lighting color, or some combination of these.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary assemblies and methods associated with an illuminated vehicle container assembly.

The illuminated vehicle container assembly includes an inner bin received within an outer bin. An interior of the inner bin can be utilized to, for example, store ice and beverages. An interior of the inner bin is selectively illuminated. The illumination can include various colors and lighting schemes.

Referring to FIGS. 1 to 4, a front 10 of a vehicle 14 includes a closure panel 18 movable to an open position as shown. The example vehicle 14 is an electric vehicle that is propelled with torque provided by electric machines. The example vehicle 14 does not include an internal combustion engine. Thus, cargo space is available for a vehicle container assembly 22 that is accessible from an exterior of the vehicle 14.

Figure 1:
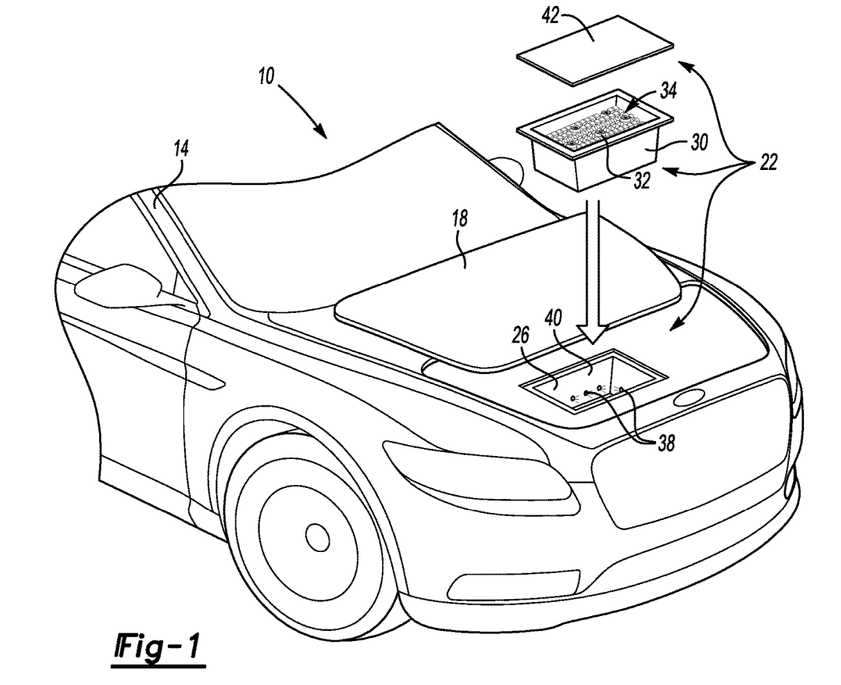
FIG. 1 illustrates a front of a vehicle with a closure panel in an open position to show an outer bin of a vehicle container assembly and an inner bin that can be received within the outer bin.
Figure 2:
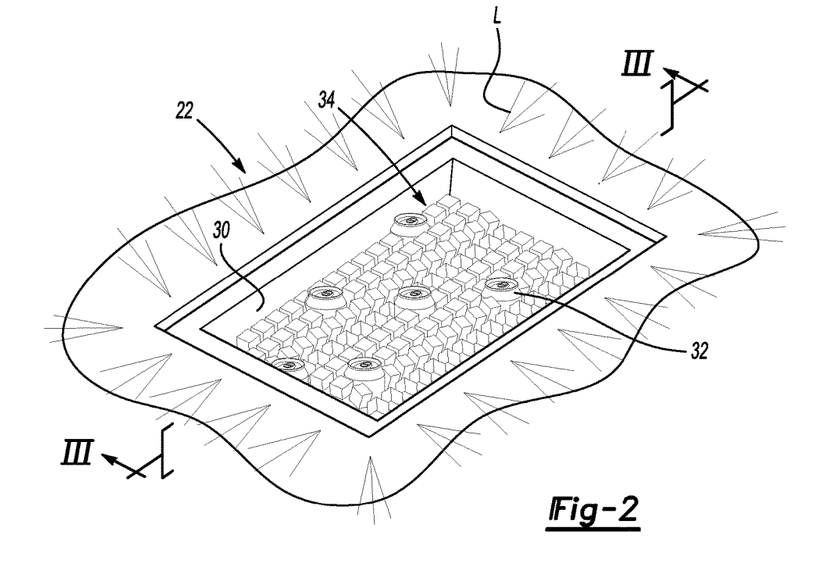
FIG. 2 illustrates a close-up view of the vehicle container assembly when the inner bin is received within the outer bin.

In other examples, the vehicle 14 could be a conventional vehicle powered by an internal combustion engine, or another type of electrified vehicle, such as a plug-in hybrid electric vehicle.

The closure panel 18, when opened, reveals the vehicle container assembly 22 that includes, among other things, an outer bin 26 and an inner bin 30. The outer bin 26 can receive the inner bin 30 such that the inner bin 30 is nested within the outer bin 26. The closure panel 18, when closed, covers the vehicle container assembly 22.

The outer bin 26, the inner bin 30, or both, can incorporate insulating materials to insulate items 32, such as beverages, ice, and food, stored within an interior area 34 of the inner bin 30. When storing items within the interior area 34 is no longer desired, the inner bin 30 can be removed to permit remaining items, such as liquid water, to be dumped out of the interior area 34. The inner bin 30 can then be replaced back within the outer bin 26.

Figure 3:
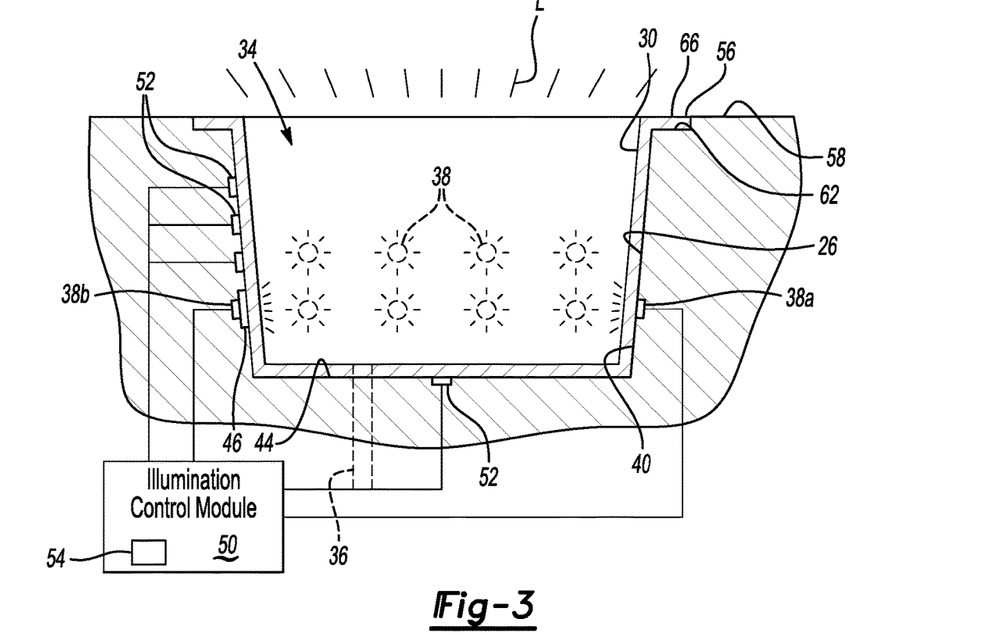
FIG. 3 illustrates a section view taken at line in FIG. 2.
Figure 4:
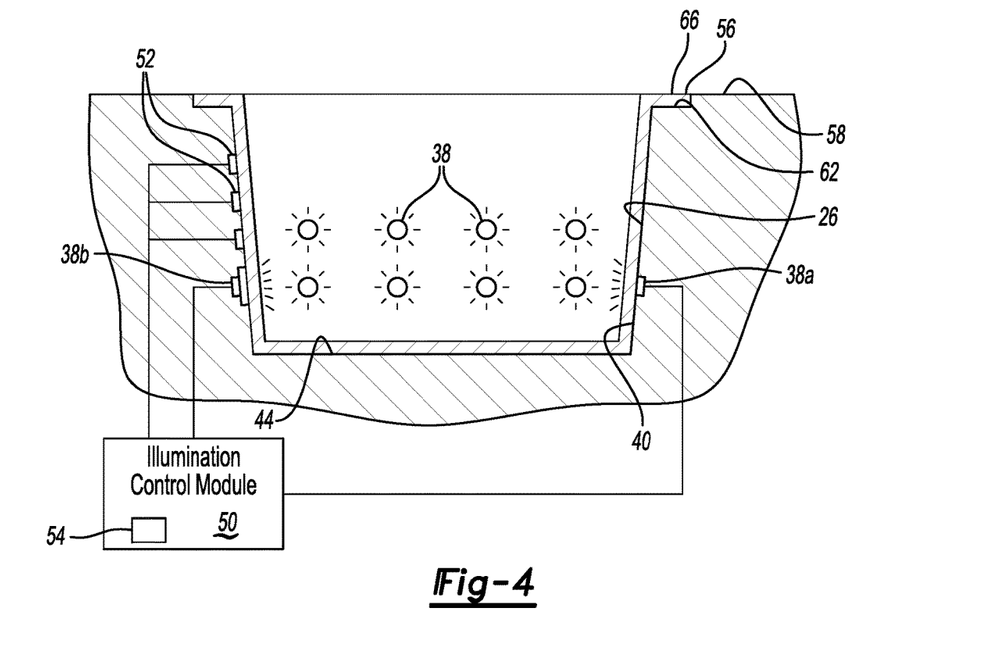
FIG. 4 illustrates the section view of FIG. 3 with the inner bin removed from within the outer bin.

In some examples, the inner bin 30, and optionally the outer bin 26, could incorporate a drain 36 to permit fluid to move from the inner bin 30 even when the inner bin 30 is within the outer bin 26. When fluid movement through the drain 36 is not desired, the drain 36 can be plugged. If the outer bin 26 does not include the drain 36, the inner bin 30 could still incorporate the drain 36 to assist with fluid removal from the inner bin 30 when the inner bin 30 is outside the outer bin 26.

At least one lighting device 38 is disposed adjacent to the outer bin 26 or within a sidewall 40 of floor 44 of the outer bin 26. The at least one lighting device 38 can be activated to illuminate the interior area 34.

The vehicle container assembly 22 can, in some examples, include a separate lid 42. In other examples, the closure panel 18 is used as the lid 42. The lid 42 can be an insulating lid that helps to maintain a desired level of thermal energy within the interior area 34. The at least one lighting device 38 could be additional incorporated into the lid 42.

Light L emanating from the at least one lighting device 38 within the sidewall 40 or the floor 44 passes through a portion of the inner bin 30 to illuminate the interior area 34 and the items 32. The light L from the at least one lighting device 38 moves through the interior area 34 to illuminate the items 32, the interior area 34, and areas surrounding the vehicle container assembly 22. These items 32 and the inner bin 30 can reflect and redirect the light L emanating from the at least one lighting device 38.

The at least one lighting device 38 can be positioned in or adjacent to a vertically lower portion of sidewall 40, such as a lower vertical half of the outer bin 26, or within or adjacent to the floor 44 of the outer bin 26. These positions of the at least one lighting device 38 can ensure that light L passes through a region of the interior area 34 containing the items 32, which can ensure that the items 32 reflect and redirect the light. Vertical, for purposes of this disclosure, is with reference to the normal orientation of the vehicle 14 when driving or when parked.

To permit light L from the at least one lighting device 38 to pass to the interior area 34 of the inner bin 30, the inner bin 30 is at least partially translucent. In this exemplary non-limiting embodiment, an entirety of the inner bin 30 is translucent. The inner bin 30 can be made from a polymer-based material, such as a translucent polycarbonate. The inner bin 30 prevents the items 32 from contacting the at least one lighting device 38. If any such contact were permitted, water, for example, could damage the at least one lighting device 38. The inner bin 30 is from three to four millimeters thick in some examples.

The at least one lighting device 38 can be a light emitting diode (LED). In an embodiment, the at least one lighting device 38 is a multi-colored LED, such as Red-Green-Blue (RGB) LED. In such examples, the illumination control module 50 can change a color of light emitted from the at least one lighting device 38. Other lighting devices could also be utilized within the scope of this disclosure. The at least one lighting device 38 can be powered by a vehicle power supply system, for example.

The at least one lighting device 38 can interface directly with the inner bin 30 when the inner bin 30 is received within the outer bin 26. Here, the lighting device 38a is shown interfacing directly with the inner bin 30. In other examples, the at least one lighting device can be covered by a lens 46 that provides a portion of the outer bin 26. Here, the lighting device 38b shows an example of a lighting device positioned behind the lens 46. The lens 46 can be a translucent material to permit light from the lighting device 38b to move through the inner bin 30 to the interior area 34.

An illumination control module 50 is operably connected to the at least one lighting device 38. The illumination control module 50 can be equipped with executable instructions for interfacing with and commanding operation of various components of the at least one lighting device 38. The illumination control module 50 can include a processing unit and non-transitory memory for executing the various control strategies and modes of the vehicle container assembly 22. The processing unit, in an embodiment, is configured to execute one or more programs stored in the memory of the illumination control module 50.

A first exemplary program, when executed, may determine when and how to illuminate (or, optionally, not to illuminate) the at least one lighting device 38. The illumination control module 50 could also control various other functions associated with the vehicle container assembly 22. In this example, each of the at least one lighting devices 38 can be individually controlled. That is, one of the at least one lighting devices 38 could be activated to emanate a blue light, another of the at least one lighting devices 38 could be activated to emanate a red light, and another of the at least one lighting devices 38 could be deactivated.

The illumination control module 50 can cause the at least one lighting device 38 to illuminate the interior area 34 in various lighting patterns. For example, the illumination control module 50 can cause the at least one lighting device 38 to flash, or the intensity of the at least one lighting device 38 to gradually increase or decrease. The changes in colors and intensity can be gradual or rapid. Various lighting patterns could be utilized, especially if the at least one lighting device 38 includes RGB LEDs.

In some specific examples, the illumination control module 50 can cause the at least one lighting device 38 to emit a neutral white light to enhance visibility of the items 32. If RGB LEDs are used as the at least one lighting device 38, the illumination control module 50 can cause the at least one lighting device 38 to mix red, green, and blue light to provide the neutral white light, which is not overly warm or cold.

In some examples, the illumination control module 50 can alter the lighting color to correct for attenuation of a particular color, say red, as the red light passes through items (e.g., liquid water) within the interior area 34. The red light may need to be increased to compensate for the red light being attenuated as the red light passes through the liquid water. Items 32, such as red cans, may be perceived as less attractive if illuminated in blue tinted light due to the attenuation from the water. Red light, as known, is attenuated by water more than other colors, such as blue.

The illumination control module 50 can respond to a command from a human machine interface within an interior of the vehicle 14, or another type of command, such as a switch located adjacent the outer bin 26. The illumination control module 50 could also respond to commands from a device outside the vehicle 14, such as a command sent via Bluetooth from a user's telephone. The commands can cause the illumination control module 50 to change a color of the light L from the at least one lighting device 38, an intensity of the light L, a lighting pattern, (e.g., blinking), etc.

A temperature sensor 52 can be mounted within the outer bin 26, or in another area adjacent to the interior area 34. The temperature sensor 52 can be utilized to sense temperatures of the interior area 34. The temperature sensor 52 can be, for example, a thermistor, thermocouple, or an infrared temperature sensor. An example infrared temperature sensor can be the Single and Dual Zone Infra Red Thermometer product manufactured by Melexis.

The temperature sensor 52, in this example, comprises a plurality of individual sensors extending up one of the sidewalls 40. The measurements from the plurality of sensors can be used to determine the presence, and level, of liquid water within the interior area 34. A significant variation in measurement between a first one of the sensors and another, vertically higher, second sensor would indicate, for example, that the level of liquid water within the interior area 34 is vertically between the first and second sensors.

The color of light from the at least one lighting device 38 could then be adjusted in response to the presence, and level, of liquid water. For example, the light L from the at least one lighting device 38 below the detected water level could be attenuated to compensate for the light L passing through liquid water. The light L from the at least one lighting device 38 above the detected water level would not be attenuated in this way because the light L from the at least one lighting device 38 above the detected water level would not pass through water.

The illumination control module 50 can adjust a color emanated from the at least one lighting device 38 in response to, for example, a temperature. The temperature can be a temperature corresponding generally to a temperature within the interior area 34. In some examples, the illumination control module 50 will cause the at least one lighting device 38 to emanate a blue light into the interior area 34 when the detected temperature is below a threshold temperature, such as 32° F. As a temperature of the interior area 34 rises, the illumination control module 50 can gradually change a color emanating from the at least one lighting device 38 to have a, for example, yellowish hue. The color change thus represents a warming of the interior area 34. This can provide a visual indication to a user of a temperature within the interior area 34. The user can then recognize the yellowish light, and, in response, add more ice to the interior area 34 so that the interior area 34 is reduced to a desired temperature.

The illumination control module 50 could illuminate the interior area 34 in yellow when the temperature of the interior area 34 is the same as an ambient temperature surrounding the interior area 34. Yellow light would then indicate that the interior area 34 is neither heating nor cooling the items 32.

The illumination control module 50 could include an alarm module 54 that tracks and monitors a temperature and time duration since the interior area 34 was loaded with items 32 and a desired temperature for the interior area 34 set by a user. The alarm module 54 could also receive an input from the user indicated the type of items 32 stored in the interior area 34.

The alarm module 54 then causes the illumination control module 50 alter a color of the light L from the at least one lighting device 38 if a safe storage time for the items 32 has passed. The safe storage time could be based on, for example, a Food and Drug Administration guideline for safe food storage. For example, if the items 32 is milk, and the temperature rises above a particular level for a particular time, the alarm module 54 can cause the illumination control module 50 to flash a red color from the at least one lighting device 38. This provide a visual indication to the user that the milk has been stored for a time period at a temperature that may cause the milk to spoil.

In this exemplary embodiment, the inner bin 30 is received within the outer bin 26 such that an uppermost surface 56 of the inner bin 30 is substantially flush with an vertically uppermost surface 58 providing the outer bin 26. The surface 58 can include a ledge 62. A lip 66 of the inner bin 30 can rest on the ledge 62 when the inner bin 30 is positioned within the outer bin 26. The lip 66 and ledge 62 can facilitate positioning the inner bin 30 within the outer bin 26 by facilitating alignment of the inner bin 30 relative to the outer bin 26. The lip 66 can also facilitate removal of the inner bin 30 from the outer bin 26 by giving a user an area to grip.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Figure 5:
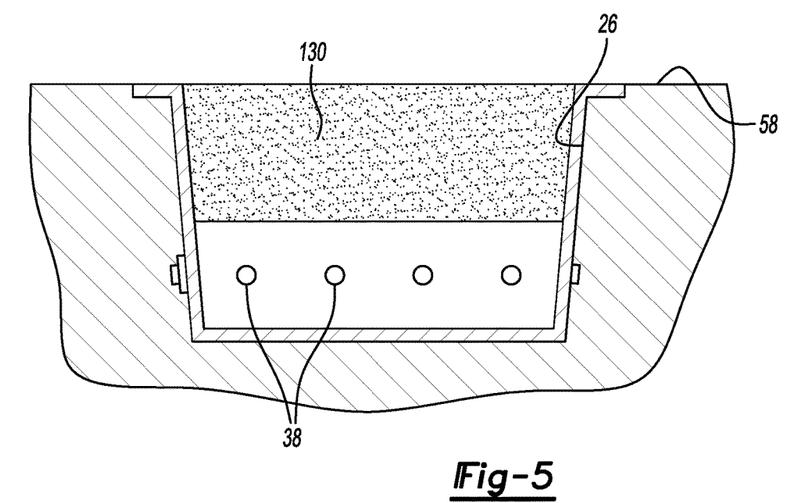
FIG. 5 illustrates a section view taken at line in FIG. 2 incorporating an inner bin according to another exemplary embodiment of the present disclosure
Figure 6:
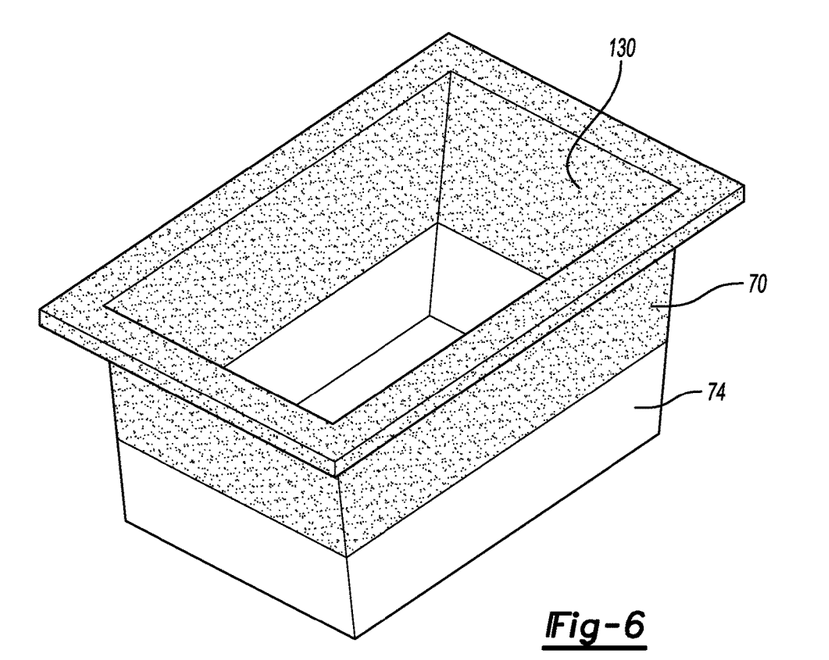
FIG. 6 illustrates a perspective view of the inner bin of FIG. 5.

Referring now to FIGS. 5 and 6, in another exemplary non-limiting embodiment, the inner bin 130 includes an opaque area 70 and a translucent area 74. When the inner bin 130 is positioned within the outer bin 26, the at least one lighting device 38 is positioned such that light emanates from the at least one lighting device 38 through the translucent area 74 rather than the opaque area 70. Incorporating the opaque area 70 and the translucent area 74 into the single inner bin 130 can be desirable in some situations, such as where color matching the inner bin 130 to the surface 58 is desired.

Figure 7:
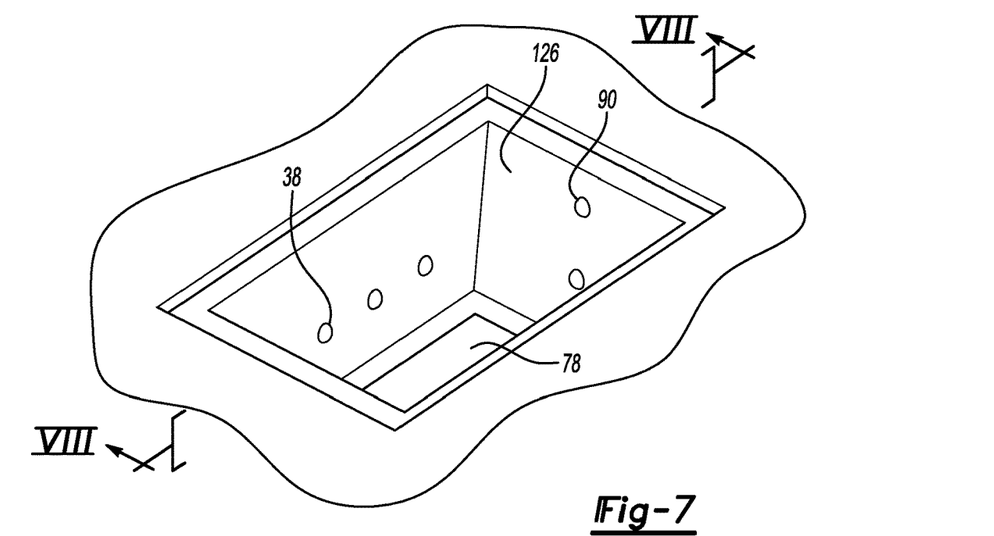
FIG. 7 illustrates a close-up view of an outer bin according to yet another exemplary embodiment of the present disclosure.
Figure 8:
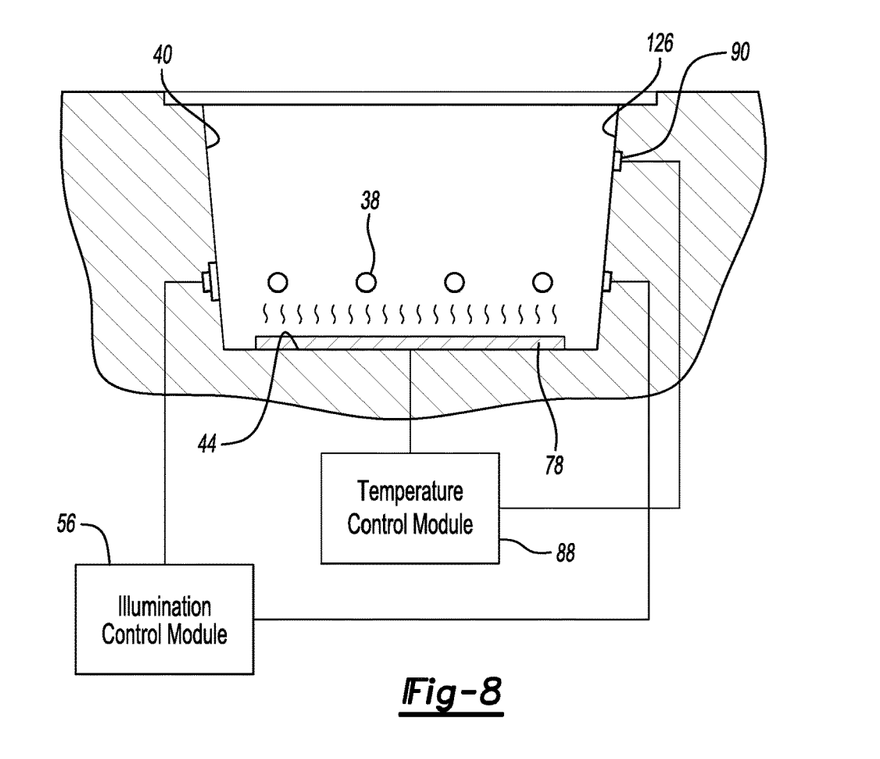
FIG. 8 illustrates a section view taken at line VIII-VIII in FIG. 7.

Referring now to FIGS. 7 and 8 with reference to FIGS. 1 and 3, another exemplary non-limiting embodiment, incorporates a heating element 78 utilized to heat the interior area 34 of the inner bin 30, and, in particular, the items 32 within the interior area 34. Heating the items 32 within the interior area 34 can be desirable in some situations. For example, the user may wish to heat items 32, such as hot dog buns or hamburger buns, when the vehicle 14 is stationary. Alternatively, the user may wish to heat the interior area 34 to prevent the items 34 within the interior area 34 from freezing when the vehicle 14 is moving, such as groceries when the vehicle 14 is returning from a grocery store.

The example heating element 78 is shown disposed on the floor 44 of an outer bin 126. The heating element 78 could be beneath the floor 44 in another example.

The heating element 78 can be, for example, a heating pad incorporating a resistive heating wire, such as a silicone rubber pad bonded to the floor 44. The heating element 78 could instead be a bulk resistive material, such as a carbon or metal particle loaded silicone rubber pad.

In another example, the heating element 78 could be disposed on the sidewall 40 of the outer bin 126, or even disposed upon the inner bin 30. The heating element 78 is operably coupled to a temperature control module 88, which receives temperature measurements from a temperature sensor 152.

The temperature sensor 152, in this example, is spaced from the heating element 78, such as within one the sidewalls 40, so that the temperature sensor 152 detects a temperature of the interior area 34 rather than the heating element 78. If a thermistor is used as the temperature sensor 152, the thermistor may need to directly contact the inner bin 30. If an infrared sensor is used as the temperature sensor 152, the infrared sensor can be spaced a distance from the inner bin 30.

The temperature control module 88 can adjust the heating element 78 to provide a desired level of thermal energy to the interior area 34. The adjustments can be in response to feedback from the temperature sensor 152. The temperature control module 88 can provide current to the heating element 78 to cause the heating element 78 to emit thermal energy. The current can be controlled to provide a desired level of thermal energy.

When the inner bin 30 is positioned within the outer bin 126, the thermal energy heats the interior area 34. The temperature control module 88 can respond to a command from a human machine interface within an interior of the vehicle, or another type of command, such as a switch located adjacent the outer bin 126. In response to the command, the temperature control module 88 generates thermal energy.

The at least one lighting device 38 can selectively illuminate the interior area 34. In some examples, the illumination control module 50 could cause the at least one lighting device 38 to illuminate a red color light when the heating element 78 is active or above a particular temperature, say 90° F. This provides a visual indication to the user that the interior area 34 is heating.

In some examples, the user can command the temperature control module 88 to activate the heating element 78 to heat the interior area 34 to a particular temperature for a set time, say one-hour. After the set time ends, the temperature control module 88 deactivates the heating element 78. The user can send the command from an interface within the vehicle 14, or from an interface outside the vehicle 14, such as a telephone. The command can indicate a particular heating time and a desired temperature.

Like the illumination control module 50, the temperature control module 88 can include a processing unit and non-transitory memory for executing the various control strategies and modes of the vehicle container assembly 22. The processing unit, in an embodiment, is configured to execute one or more programs stored in the memory of the temperature control module 88. The temperature control module 88 and the illumination control module 50 can be modules within a common control module, or separate modules.

The illumination control module 50 could initiate the heating, control a length of time that the heating element 78 is activated, only activate the heating element 78 when an engine of the vehicle is on (if the vehicle includes and engine).

Exemplary features of the disclosed embodiments can include a vehicle container assembly that can be illuminated to provide task lighting. The illumination can comprise various colors and may visually indicate a temperature. The illumination can be multi-colored where the individual lighting devices emit different colors. The illumination can include continuously varying the intensity of light from all of the lighting devices, or from individual lighting devices.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle container assembly, comprising:
   an outer bin;
   an inner bin received within the outer bin;
   a lighting assembly that illuminates an interior of the inner bin through a translucent area of the inner bin, the lighting assembly disposed within the outer bin; and
   a translucent lens of the outer bin, the lighting assembly illuminating the interior with light that moves from the lighting assembly and passes through both the translucent lens and the inner bin.

2. The assembly of claim 1, wherein an entirety of the inner bin is translucent.

3. The assembly of claim 1, wherein the lighting assembly comprises at least one light emitting diode (LED).

4. The assembly of claim 3, wherein the LED is a multi-colored LED.

5. The assembly of claim 1, wherein the lighting assembly is configured to selectively illuminate the interior in a plurality of different colors.

6. The assembly of claim 5, further comprising a temperature sensor, wherein a first one of the colors in the plurality of different colors corresponds to a first temperature measured by the temperature sensor, and a different, second one of the colors in the plurality of different colors corresponds to a different, second temperature measurement measured by the temperature sensor.

7. The assembly of claim 1, further comprising a lid that covers the interior.

8. The assembly of claim 1, further comprising a heater that selectively heats the interior of the inner bin.

9. A vehicle comprising the vehicle container assembly of claim 1 in a compartment of the vehicle.

10. The vehicle of claim 9, wherein the vehicle is an electrified vehicle.

11. A vehicle container illumination method, comprising:
    illuminating an interior area of an inner bin through a translucent area of the inner bin wherein light emanates from a lighting assembly within the outer bin during the illuminating, wherein light from the lighting assembly passes through a translucent lens of the outer bin and additionally passes though the translucent area of the inner bin during the illuminating.

12. The method of claim 11, wherein the inner bin is received within an outer bin during the illuminating.

13. The method of claim 12, wherein the inner bin is removable from the outer bin.

14. The method of claim 11, wherein an entirety of the inner bin is translucent.

15. The method of claim 11, further comprising heating the interior area with a heat source adjacent an exterior of the inner bin.

16. The method of claim 11, further comprising adjusting a lighting pattern of the illuminating by changing a lighting intensity, a lighting color, or some combination of these.

17. A vehicle container illumination method, comprising:
- illuminating an interior area of an inner bin through a translucent area of the inner bin, the illuminating including illuminating the interior area with a first color in response to a first temperature and illuminating the interior area with a different, second color in response to a different, second temperature.

* * * * *

UNITED STATES PATENT AND TRADEMARK OFFICE
CERTIFICATE OF CORRECTION

| | |
|---|---|
| PATENT NO. | : 10,202,069 B2 |
| APPLICATION NO. | : 15/645139 |
| DATED | : February 12, 2019 |
| INVENTOR(S) | : Stuart C. Salter et al. |

It is certified that error appears in the above-identified patent and that said Letters Patent is hereby corrected as shown below:

In the Claims

In Claim 11, Column 8, Line 54; replace "within the outer bin" with --within an outer bin--

In Claim 12, Column 8, Line 60; replace "within an outer bin" with --within the outer bin--

Signed and Sealed this
Eighteenth Day of June, 2019

Andrei Iancu
*Director of the United States Patent and Trademark Office*